(12) United States Patent
Quintal

(10) Patent No.: US 8,840,360 B2
(45) Date of Patent: Sep. 23, 2014

(54) HORIZONTAL WIND POWERED TURBINE

(76) Inventor: Réjean Quintal, St-Jean-sur-Richelieu (CA)

( * ) Notice: Subject to any disclaimer, the term of this patent is extended or adjusted under 35 U.S.C. 154(b) by 743 days.

(21) Appl. No.: 13/106,215

(22) Filed: May 12, 2011

(65) Prior Publication Data

US 2011/0250069 A1 Oct. 13, 2011

Related U.S. Application Data

(63) Continuation-in-part of application No. PCT/CA2010/000528, filed on Apr. 8, 2010.

(51) Int. Cl.
*F03D 3/04* (2006.01)
*F03D 3/00* (2006.01)

(52) U.S. Cl.
CPC .............. *F03D 3/002* (2013.01); *F05B 2240/13* (2013.01); *F03D 3/0436* (2013.01); *Y02E 10/74* (2013.01); *Y02B 10/30* (2013.01)
USPC .......................................................... 415/4.1

(58) Field of Classification Search
CPC ......... F03D 3/002; F03D 3/04; F03D 3/0409; F03D 3/0418; F03D 3/0427; F03D 3/0436; F03D 3/06; F03D 3/061; F03D 3/062; F03D 3/064; F03D 3/065; F03D 7/06; F03D 9/002; H02K 7/183
USPC ............. 415/4.1, 4.3, 4.5, 908, 194; 416/195, 416/196 A, 197 R, 197 A
See application file for complete search history.

(56) References Cited

U.S. PATENT DOCUMENTS

| 325,025 | A | | 8/1885 | Tefft |
| 648,442 | A | | 5/1900 | Scott |
| 1,407,373 | A | | 2/1922 | Brymer |
| 2,886,361 | A | * | 5/1959 | Matson et al. ..................... 403/9 |
| 4,357,130 | A | * | 11/1982 | Forrest ....................... 416/197 A |
| 4,408,955 | A | * | 10/1983 | Wagle et al. .................. 416/119 |
| 4,764,683 | A | * | 8/1988 | Coombes ......................... 290/55 |
| 4,818,180 | A | * | 4/1989 | Liu ............................... 416/117 |
| 5,083,902 | A | | 1/1992 | Rhodes |
| 6,402,472 | B1 | | 6/2002 | Hogue |

(Continued)

FOREIGN PATENT DOCUMENTS

| FR | 365045 | 9/1906 |
| FR | 2 292 878 | 6/1976 |
| GB | 188732 | 11/1922 |
| GB | 2185786 | 7/1987 |

*Primary Examiner* — Edward Look
*Assistant Examiner* — Jeffrey A Brownson
(74) *Attorney, Agent, or Firm* — Norton Rose Fulbright Canada LLP

(57) ABSTRACT

A wind powered turbine is comprised of a frame on which is horizontally and rotatably supported a rotor on a rotor shaft. The rotor is formed by three or more radial blade members which are secured to the rotor shaft. The radial blade members are equidistantly spaced from one another and each have support arms and a wind vane secured at an outer end portion of the support arms. The wind vane is shaped to capture an airflow directed thereagainst for displacement thereof to create a rotational force about the rotor shaft to rotate the shaft about its longitudinal central axis. The radial blade members are rigidly interconnected to one another at an outer end portion thereof by tension adjustable bracing tie wires. A wind channeling guide assembly accelerates and directs the airflow in an actuating airflow path to impinge upon at leas of the wind vanes positioned in the actuating airflow path.

49 Claims, 10 Drawing Sheets

(56) References Cited

U.S. PATENT DOCUMENTS

| | | | |
|---|---|---|---|
| 6,655,907 B2* | 12/2003 | Brock et al. | 415/4.2 |
| 6,857,846 B2* | 2/2005 | Miller | 415/4.2 |
| 6,981,839 B2 | 1/2006 | Fan | |
| 7,315,093 B2* | 1/2008 | Graham, Sr. | 290/55 |
| 7,540,705 B2 | 6/2009 | Emshey | |
| 7,834,477 B2* | 11/2010 | Sheikhrezai | 290/55 |
| 8,011,876 B2* | 9/2011 | Gradwohl et al. | 415/4.2 |
| 8,072,091 B2* | 12/2011 | Wilson et al. | 290/55 |
| 8,128,361 B2* | 3/2012 | Dawson et al. | 416/1 |
| 8,322,992 B2* | 12/2012 | Fuller | 416/197 A |
| 2002/0015639 A1* | 2/2002 | Roberts | 415/4.1 |
| 2003/0133782 A1* | 7/2003 | Holter et al. | 415/4.2 |
| 2008/0315592 A1* | 12/2008 | Branco | 290/55 |
| 2010/0183443 A1* | 7/2010 | Thorne | 416/146 R |

\* cited by examiner

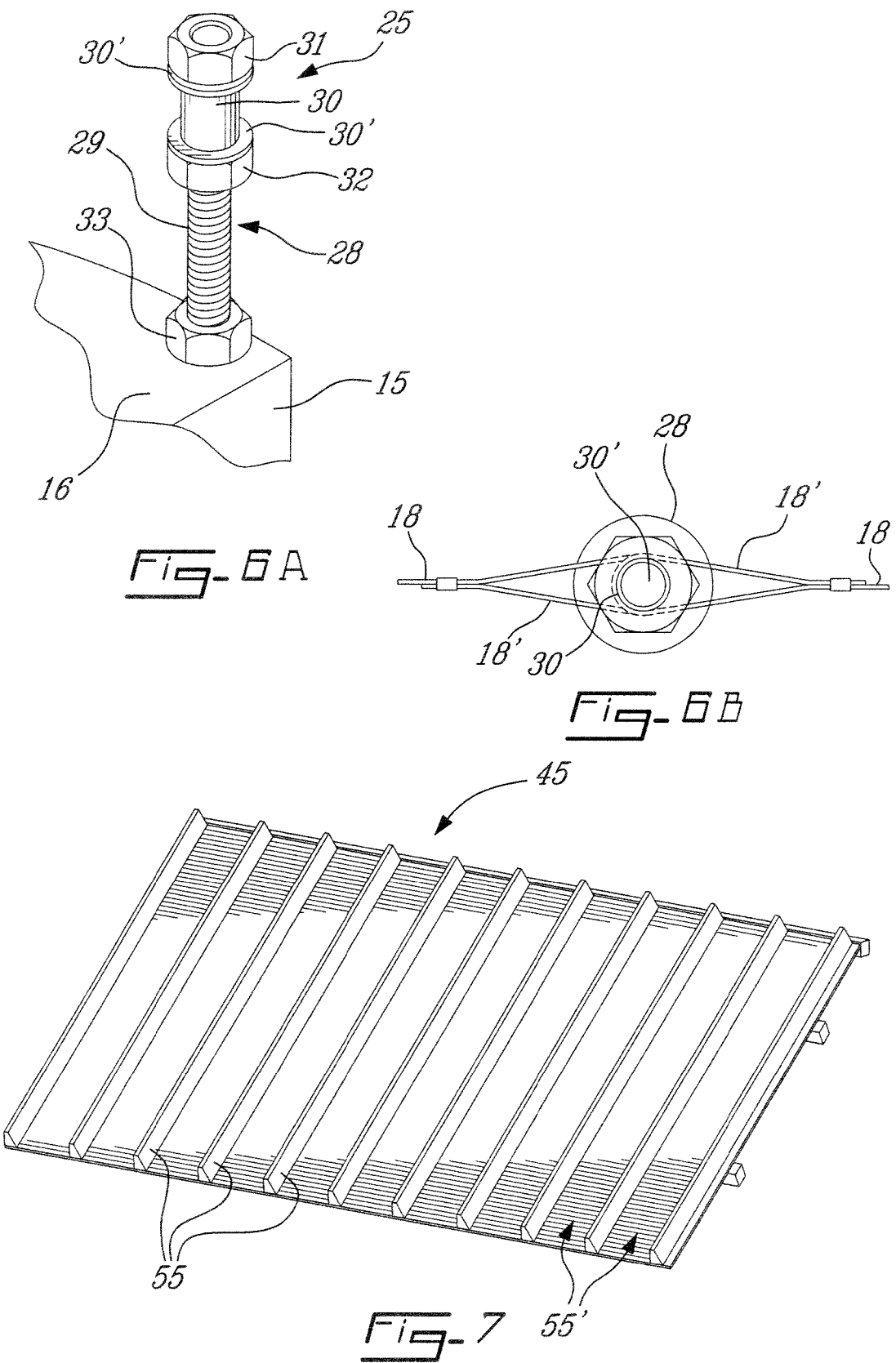

| Savonius | |
|---|---|
| Cp théorique | 0.21 |
| Cp théorique réel | 0.38 |

| Darrieus | |
|---|---|
| Cp théorique | 0.40 |
| Cp augmentation | 1.93 |
| Cp réel | 0.73 |

HORIZONTAL WIND POWERED TURBINE

CROSS-REFERENCE TO RELATED APPLICATION

This application is a continuation-in-part of PCT Application No. PCT/CA2010/000528, filed on Apr. 8, 2010.

TECHNICAL FIELD

The present invention relates to a lightweight horizontal wind powered turbine for generating power.

BACKGROUND ART

High cost of energy and the depletion of natural resources has led to the increasing development of environmentally safe and inexpensive alternative energy sources. The present invention concerns the use of the wind energy to develop electrical energy and specifically to wind powered turbines. Wind powered turbines have been in existence for many years but these are usually very costly to produce and often are not operational at very low wind speeds namely below 5 km/h. Some of these wind turbines are also massive structures which are unsightly and therefore are usually located in remote areas with the electricity produced being conducted by overhead or underground cables to distribution transformers. These large wind turbine structures are also expensive to install, requiring heavy equipment and a skilled workforce. Before the installation of such turbines it is also necessary to obtain environment impact studies and approval by regional governing bodies which demands public consultations. These large wind turbines are vertically mounted turbines and are not pleasing to the eye and not suitable to adapt to produce electricity for a single industrial or residential building. However, horizontal wind turbines have proven more pleasing to the eye but again the constructions thereof are often unsightly and they are often too costly and heavy for mounting on roofs of building structures. Typical examples of wind powered horizontal turbines are disclosed in U.S. Pat. Nos. 6,981,839 and 7,540,705 and British Patent GB 2,185,786. The wind turbines disclosed by these patents all have certain constraints such as not being able to operate at low wind speeds, they are heavy and noisy, require extensive maintenance and are not aesthetically pleasing when mounted on the roof tops of buildings.

DISCLOSURE OF INVENTION

It is a feature of the present invention to provide a horizontal wind powered turbine which substantially obviates the above-mentioned disadvantages of existing horizontal wind turbines.

A further feature of the present invention is to provide a horizontal wind powered turbine wherein the rotor is constructed in a unique fashion to make it very lightweight and capable of operating at very low wind speeds.

Another feature of the present invention is to provide a horizontal wind powered turbine which may operate in a uni-directional or bi-directional state without displacing the turbine.

Another feature of the present invention is to provide a horizontal wind powered turbine which is easy to install and does not require skilled personnel for its installation and servicing.

Another feature of the present invention is to provide a horizontal wind powered turbine which can be automatically controlled by a programmed controller module.

Another feature of the present invention is to provide a horizontal wind powered turbine which may be coupled in series and which series can be disposed in an assembly of back-to-back spaced series connected turbines.

Another feature of the present invention is to provide a horizontal wind powered turbine having an air inlet channeling structure provided with an adjustable gate defining a shape to impart a venturi effect to the airflow entering the turbine.

Another feature is to provide a horizontal wind turbine to which is integrated photovoltaic solar panels to increase the $W/m^2$ of roof top.

According to the above features, from a broad aspect, the present invention provides a horizontal wind powered turbine comprised of a frame on which is horizontally and rotatably supported a rotor on a rotor shaft. The rotor is formed by three or more radial blade members secured to the rotor shaft by securement means. The radial blade members are equidistantly spaced from one another. Each radial blade member has support arms and a wind vane secured to an outer end portion of the support arms. The wind vane is shaped to capture an airflow directed thereagainst for displacement thereof to create a rotational force about the rotor shaft to rotate the rotor shaft about a longitudinal central axis thereof. The radial blade members are rigidly interconnected to one another at an outer end portion thereof by tension adjustable bracing means. Wind channeling guide means are provided to accelerate and direct the airflow in an actuating airflow path to impinge upon at least one of the wind vanes positioned in the actuating airflow path to displace the wind vane by wind drag.

According to another broad aspect of the present invention the wind vanes can be either of elongated bucket-shaped wind vanes or elongated elliptically-shaped wind vanes.

BRIEF DESCRIPTION OF THE DRAWINGS

A preferred embodiment of the present invention will now be described with reference to the accompanying drawings in which:

FIG. 6A is a perspective view showing the construction of the adjustable wire connector;

FIG. 6B is a top view showing the loop end of a tie-wire disposed about the wire attaching sleeve and superimposed with the loop end of an adjacent wire;

FIG. 7 is a perspective view showing the construction of the guide ramp wall formed with vertical guide ribs;

MODES FOR CARRYING OUT THE INVENTION

Figure 1A:
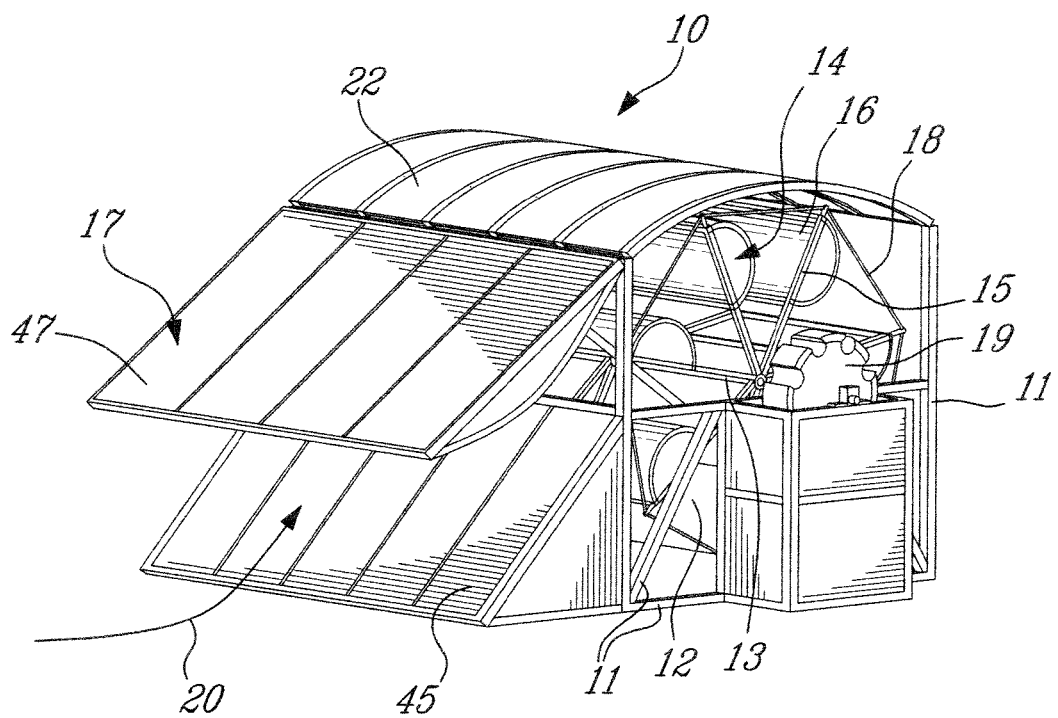
FIG. 1A is a simplified perspective view showing the construction of the horizontal wind powered turbine of the present invention.
Figure 1B:
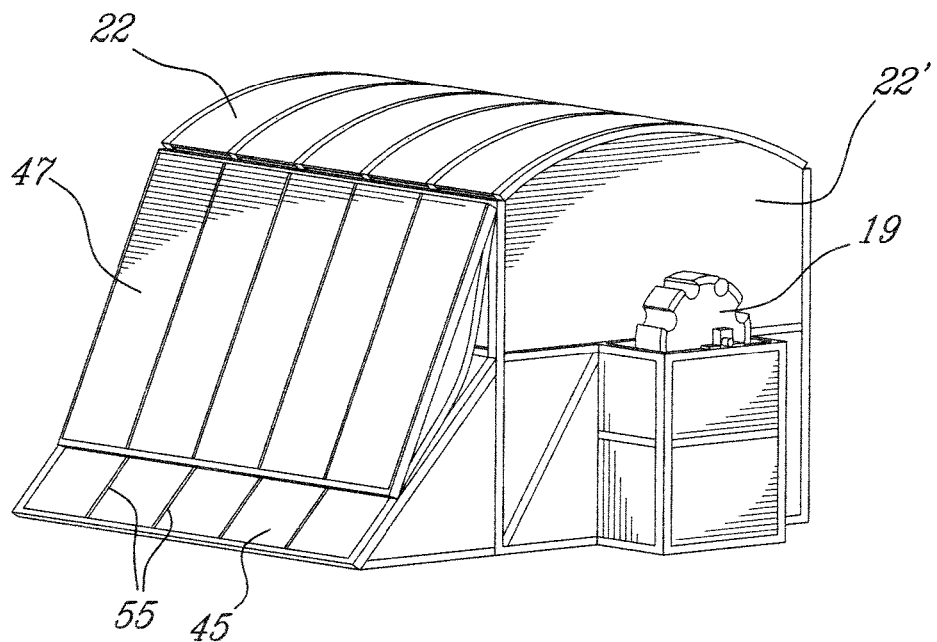
FIG. 1B is a perspective view similar to FIG. 1A but showing the turbine housing in a closed condition wherein the air inlet channeling structure is closed.

Referring now to the drawings and more particularly to FIGS. 1A and 1B, there is shown generally at 10 an embodiment of the wind powered turbine of the present invention. The turbine 10 comprises a frame 11 on which is horizontally and rotatably supported a rotor assembly generally at 12 on a rotor shaft 13. The rotor shaft 13 is supported on standard bearings, not shown. The rotor assembly 12 is formed by three or more radial blade members 14 secured to the rotor shaft 13 by securement means as will be described later.

As hereinshown there are seven radial blade members 14 which are equidistantly spaced from one another about the rotor shaft 13. Each radial blade member 14 has support arms 15 and a wind vane 16 secured to an outer end portion of the support arms 15. The wind vane 16 is shaped to capture an airflow 20, as shown in FIG. 8C, directed thereagainst for displacement thereof to create a rotational force about the rotor shaft 13 whereby to rotate the rotor shaft about a longitudinal central axis thereof. The rotor shaft 13 is connected to the drive shaft of an electric motor 19 coupled thereto by conventional means, well known in the art. The support arms 15 and wind vane are constructed from aluminum for lightweight.

The radial blade members 14 are rigidly interconnected to one another at an outer end portion thereof by tension adjustable bracing tie-wires 18 which constitute an adjustable bracing means. These tie-wires are steel wires and their adjustability provide for a rotor structure which is very lightweight and strong, providing for a lightweight rotor shaft thereby greatly reducing the weight of the rotor shaft and the assembly 14 and permitting the rotor to be actuated or displaced at very low wind speeds below 5 km/h. The tie-wires 18 may be constructed of other suitable material including composite materials.

The wind powered turbine of the present invention also has an air inlet channeling structure 17 to accelerate and direct the incoming airflow, herein represented by arrow 20, in an actuating airflow path 21 (see FIG. 8C) directed in an upper portion of the housing adjacent a convexly curved top wall 22. The radial blade members 14 extend into this accelerating airflow path 22 and spaced from the top wall 22 whereby the airflow impinges upon the vanes disposed in this actuating airflow path to displace the wind vane and causes its displacement by wind drag. The inlet can capture wind in a radius of about 140°. As shown in FIG. 8C, this airflow path exits in the rear end 23 of the wind powered turbine. The air is caused to enter the turbine housing at an angle of between 30° and 50°. This increases wind speed and reduces drag on the returning vanes 16.

Figure 9:
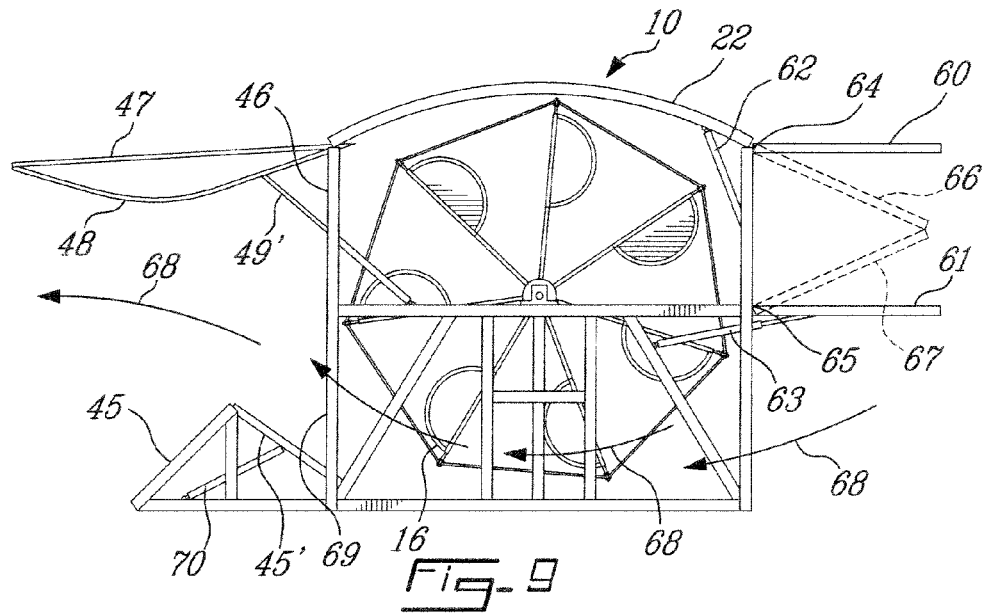
FIG. 9 is a simplified side view showing the wind powered turbine of the present invention provided with top and bottom outlet gates provided at the outlet of the wind powered turbine housing whereby the turbine can be operated in a bi-directional mode that is to say from the back or the rear of the turbine.

As shown in FIG. 1B, the frame may be provided with side walls 22' and have rear gates, as shown in FIG. 9, to form a complete shelter to protect the turbine from difficult weather conditions such as snow, hail, heavy rain and heavy high winds. The shelter is not essential for the functionality of the turbine but provides better performance.

Figure 4A:
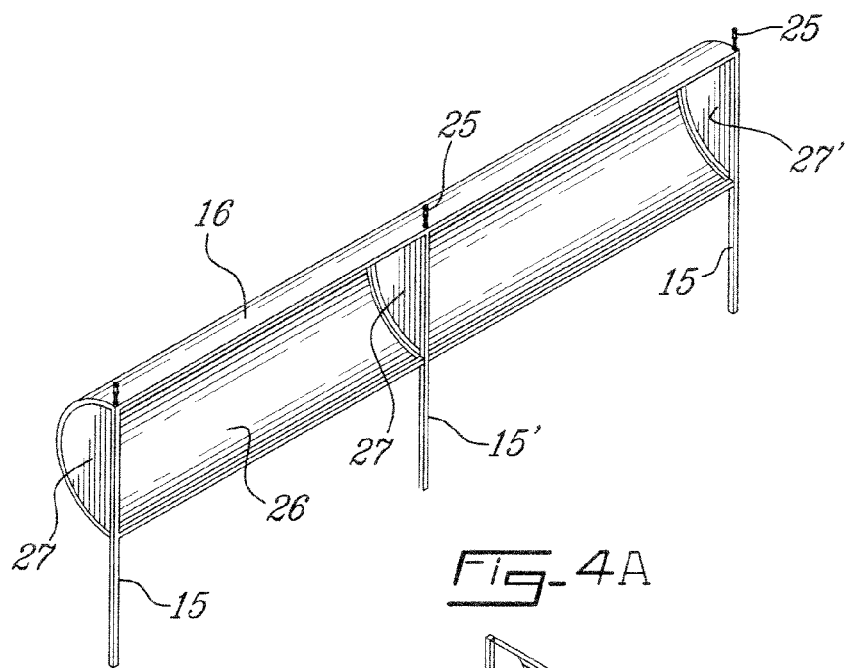
FIG. 4A is a perspective view showing the construction of the radial blade members.
Figure 4B:
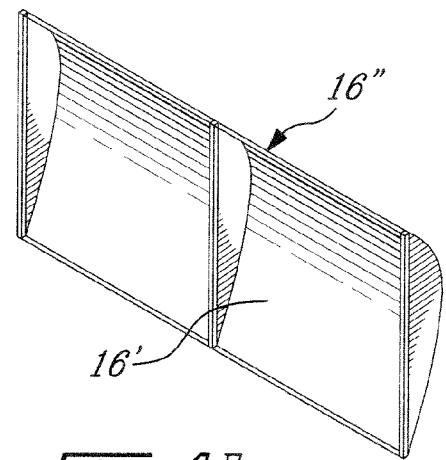
FIG. 4B is a perspective view of another embodiment of the construction of a radial blade.

As shown in FIG. 4A, the wind vane 16 is of semi-circular cross-section. Another alternative shape is illustrated in FIG. 4B wherein the wind vane 16" has a semi-elliptical shape. The wind vanes are also secured between at least two support arms 15. One or more intermediate support arms 15' may also be provided if the wind vane is longer, thereby requiring additional support. The wind vane 16 thereby defines a curved inner wall 26. It also has transverse end walls 27 which are wind captivating end walls when the wind is at an angle.

Intermediate wind captivating walls 27' may be provided if additional support arms, such as support arm 15', are provided. These transverse end walls 27 and intermediate wall 27' are secured behind the support arms 15 and 15', respectively.

Figure 5:
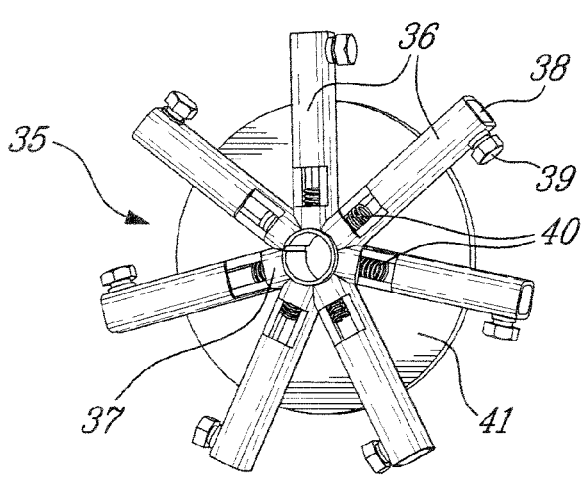
FIG. 5 is a perspective view illustrating the construction of the shaft connecting assembly secured to the rotor shaft and to which the support arms of the radial blade members are retained.

With reference now to FIG. 5, there is shown a securement means for securing the radial blade members 14 to the rotor shaft 13. As hereinshown, this securement means is comprised by a shaft connecting assembly 35 there being of course two of such assemblies to connect wind vanes having two support arms 15. The shaft connecting assembly 35 has three or more rigid hollow posts 36, herein seven rigid posts 36 to accommodate the wind vanes 16 of the embodiment illustrated in FIG. 1A and these rigid posts 36 are immovably secured to a hub 37 and a metal disc 41 which is adapted for securement to the rotor shaft in a spaced-apart relationship. The rigid posts 36 are hollow metal posts having an open top end 38 to receive therein a bottom end portion 15" of the support arms 15. The support arms 15 are aluminum rods and have a cross-section for close sliding fit engagement in the open ends of respective ones of the hollow tubular posts 36. Arresting means in the form of lock screws 39 immovably secures the solid rods in the hollow tubular post, prior to tensioning the tie-wires 18. Spring biasing means, in the form of coil springs 40, are held captive in the bottom of the hollow tubular rigid post 36 and the support arms 15 sit on these and the lock screws 39 are set to retain the arms 15 in the hollow posts 36 during initial tensioning of the tie-wires 18.

With reference now to FIGS. 6 and 6B, there will be described the tension adjustable bracing means which, as above-described, is comprised by tie-wires 18. These wires 18 are of equal lengths and are secured to an adjustable wire connector 25 secured to the top end of the support arms 15 of the radial blade members. The adjustable wire connector 25 is an adjustable bolt 28 having a threaded shaft portion 29 threadably connected in the free outer end of the support arms 15 whereby to adjust the length of the bolt above the vanes. A wire attaching sleeve 30, having opposed end flanges 30', is supported about a top end of the adjustment bolt 28 and captively receives therein an end attaching loop 18' of the tie wires 18, as shown in FIG. 6B, the bolt connector 25 has an engageable outer head 31 to impart rotation of the bolt 28 into the top end of the support arms 15 to adjust the outward displacement of the wire attaching sleeve whereby to apply tension on the tie-wires secured about the sleeve and extending in opposite directions. By displacing the adjustable bolt axially, the wire attaching sleeve is displaced to increase or decrease tension in the opposed tie-wires 18 as illustrated in FIG. 6B. The tie-wires 18 are tensioned while the support posts are held secured at their lower ends in the rigid hollow posts with the bottom end of the posts resting on their coil springs 40. This provided for construction of a rigid balanced brace about the radial blade members 14. Thus, a lightweight frame structure consisting of rigidly interconnected radial blade members in spaced relationship is obtained and strengthening the radial blade member assembly about the rotor shaft. The lock nuts 32 are then loosened with the lower end of the support posts resting on their springs 40. The purpose of the springs is to permit absorption of the expansion in the metabolic support arms 15 due to temperature fluctuations. This prevents distortion in the support arms if they were to be immovably secured to shaft connecting assembly 35.

It is also pointed out that the wire attachment sleeve 30 can be made displaceable about a stationary post or the bolt 28 to provide this adjustment. By displacing the nuts 31 and 32 along the threaded shaft, which is now stationary, the sleeve position is made adjustable. Both these adjustable wire connectors have been found to be very effective, precise and an economical adjustable mechanism.

The tie-wires interconnected together about the outer circumference of the rotor assembly maintain the support arms captive in the hollow tubular posts 36 of the shaft connecting assembly 35, shown in FIG. 5. The rigid post and hub structure are welded on the flat steel disc 41 to maintain the rigid posts in a solid structure as the torque created by the wind vanes 13 is transmitted into the shaft through the connecting assembly 35 which drives the rotor shaft 13. The diameter of the rotor is made to suit the application of the use of the turbine and by increasing the diameter thereof the energy produced can be greatly increased. For example, doubling the diameter will result in a five times increment in the energy produced.

Referring now to FIGS. 1A, 1B, 2 and 7 to 9, there will be described the construction and operation of the channeling guide means constituted by the air inlet channeling structure 17, as shown in FIG. 1A. This structure is comprised of an inclined guide ramp wall 45 which is secured below an air inlet end of the frame 11, and an adjustable venturi gate 47 hingedly connected to the frame 11 at a top end 46' of the air inlet end or air inlet opening 46. The guide ramp wall is angulated between 30° and 50°. The adjustable venturi gate 47 has an inner wall surface 48 which defines a convex curvature to impart a venturi effect in the region 20' (see FIG. 8C) of the inlet airflow 20 whereby to accelerate the airflow 20 to create the actuating airflow path 21 inside the wind powered turbine. The arced roof 22 follows the wind turbine arc and limits the turbulence created by the housing and/or frame. The arc roof 22 also adds rigidity to the frame structure 1 and facilitates cleaning of the roof of snow and channels rain water outwards. It also provides an aerodynamic shape for the wind flow.

The adjustable venturi gate 47 is pressure biased in an open position by a pair of shocks 49 and a wire and pulley mechanism 50 comprised of wire 51 and guide pulleys 52 and motor 53 displace the adjustable venturi gate against the biasing force of the pistons 49' to set the proper distance between the inner venturi surface 48 of the gate and the top surface 45' of the inclined guide ramp. This biasing arrangement obviates the use of a hydraulic system which is costly and troublesome. As shown in FIG. 1B, the adjustable venturi gate is displaced to a closed position wherein the gate 47 abuts against the inclined guide ramp wall 45 whereby to substantially obstruct the air inlet end. This may be desirable under very high wind conditions or in conditions where the turbine is not utilized. Of course, other means may be provided to constitute a gate displacement means and a pressure exerting means to maintain the adjustable venturi gate at a desired position. For example, slotted guide rods may be pivotally connected at one end to the frame and at another end to the adjustable venturi gate with lock bolts extending in the slot to rigidly secure the adjustable venturi gate at a desired angle.

Figure 2:
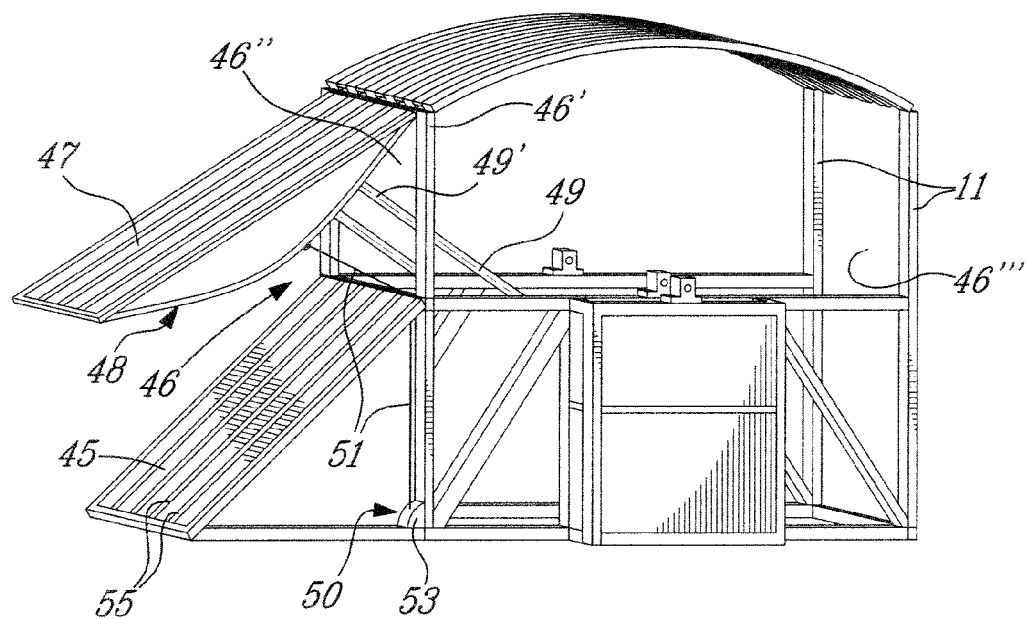
FIG. 2 is a perspective view of the turbine support frame with the rotor removed showing the construction of the frame and the air inlet channeling structure disposed in an open condition and illustrating the adjustable mechanism of the adjustable venturi gate.
Figure 3:
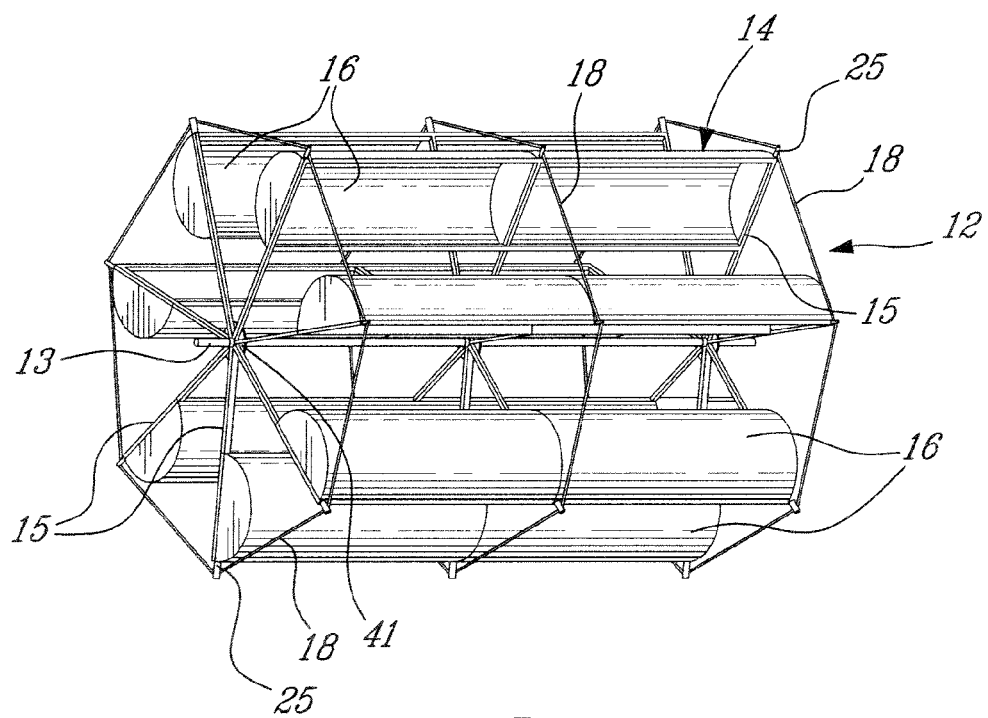
FIG. 3 is a perspective view showing the rotor in an assembled condition.

Wind speed test have shown that with the adjustable venturi gate 47 positioned as shown in FIG. 2 and with an exterior wind speed of 19 km/h the wind increased to 20.5 km/h at the mouth of the inclined guide wall 45 and the gate 47. As the wind traveled up the ramp wall 45 it increased to 22.0 km/h and the concentration air flow entering the inlet end 46" of the housing was measured at 23 km/h. The wind speed on the vanes of the turbine at the top of the housing was also 23 km/h and the air flow returned to its initial speed at the outlet 46'" of the housing.

As shown in FIG. 7, the inclined guide ramp wall 45 is provided with a plurality of vertical guide ribs 55 disposed spaced-apart and axially oriented towards the air inlet end 46 to redirect airflow from the airflow path impinging thereupon angularly as illustrated by arrows 55' and from either side thereof. This helps in captivating and reorienting wind from the side of the wind powered turbine housing.

Figure 10:
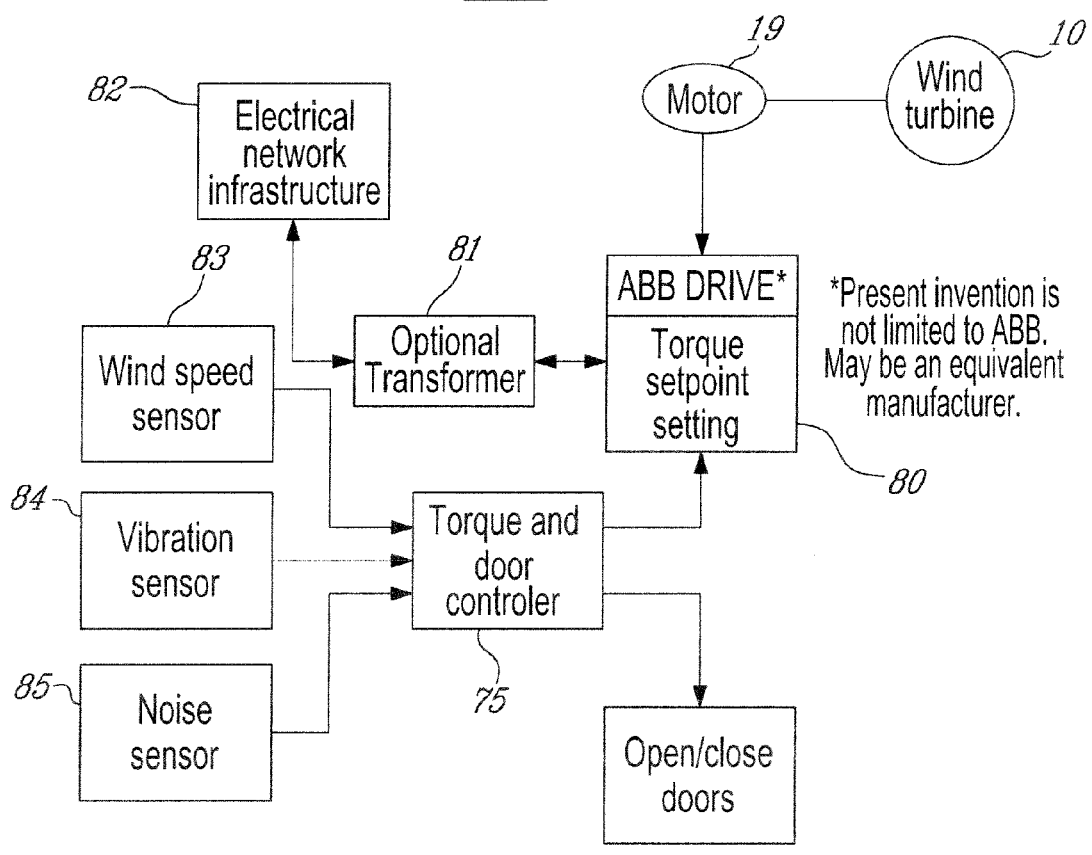
FIG. 10 is a simplified block diagram showing the wind turbine of the present invention coupled to an electric network infrastructure and incorporating a system controller to operate the turbine and the regenerative drive.

Referring now to FIG. 9, there is shown a further modification of the wind powered turbine 10 of the present invention. As hereinshown, the turbine 10 is adapted to operate as a bi-directional turbine, that is to say form the front end or rear end thereof and oriented to capture most of the predominant winds. In order to do this effectively, there is connected at the outlet end of the housing a top and bottom outlet gate 60 and 61, respectively, and these gates are biased by shocks 62 and 63, respectively, and operated in a similar fashion with a wire and pulley assembly operated by a motor to adjust the position of the top and bottom outlet gates. These gates would be operated automatically by a system controller 75, as shown in FIG. 10, and which will be described later, which senses the wind direction and wind speed. As hereinshown, the top outlet gate 60 is hingedly connected at 64 to a top end of the rear end of the frame 11 and the bottom outlet gate 61 hingedly connected at substantially midway of the rear end of the frame, as identified by reference numeral 65.

As shown in FIG. 9, the outlet gates 60 and 61 are in their normal open position with the wind directed into the front end of the wind turbine housing 10 and exiting in the back between the gates 60 and 61 which are positioned to provide an unobstructed air stream. When the wind is directed from the rear of the housing, the top outlet gate 10 is displaced to its position, as indicated by phantom lines 66, and the bottom outlet gate 61 is displaced to its position, as indicated in phantom lines 67. Accordingly, air is admitted into the lower half portion of the housing to create a reverse actuating airflow path 68 impinging upon the radial blade members or vanes 16 in a lower part of the housing or frame. In order not to obstruct the outlet of this reverse airflow path 68, the inclined guide ramp wall 45 has a hinge ramp section 45' which is hingeable inwards, as shown in solid line in FIG. 9, to create an opening 69 below the air inlet end 46 for the passage of the reverse actuating airflow 68. Also, the hinge ramp section 45 provides a guide wall surface for the reverse actuating airflow path. As hereinshown, the ramp section 45' is actuated by a shock 70 and pulley and cable mechanism, not shown, which may be operated by the system controller 75 or by a piston controlled by the controller unit, although not desirable. Accordingly, it can be seen that the wind powered turbine can operate from either the front or rear thereof and be able to captivate winds angulated thereto.

Figure 8A:
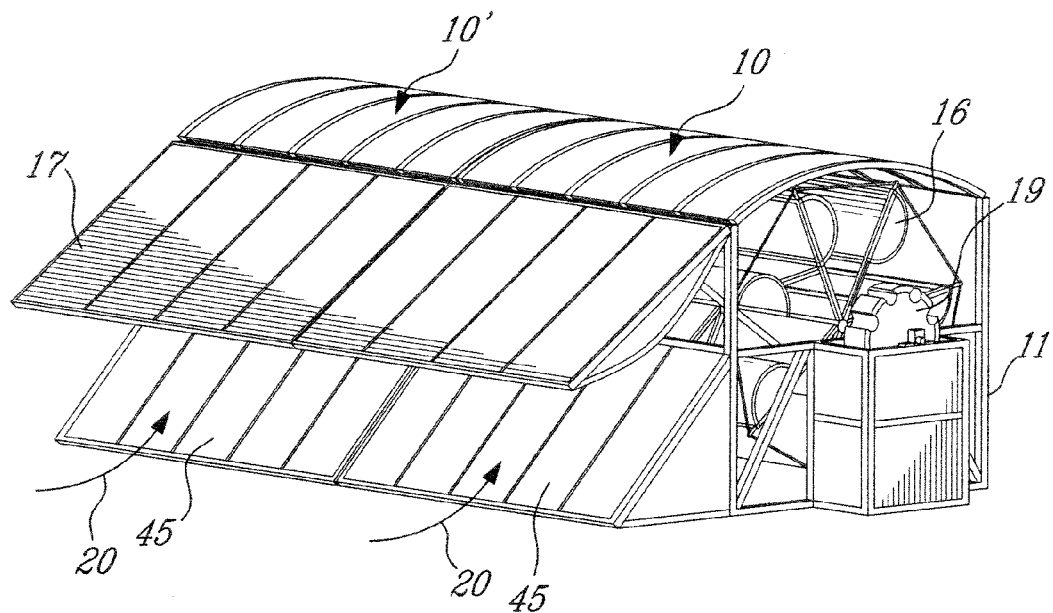
FIG. 8A is a perspective view of the horizontal wind powered turbine of the present invention when connected side-by-side with a like horizontal wind powered turbine.
Figure 8B:
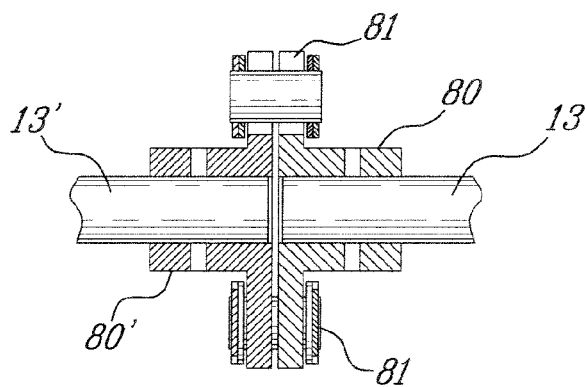
FIG. 8B is a cross-sectional view showing an example of the interconnection of the rotor shafts of the serially connected turbines of FIG. 8A.
Figure 8C:
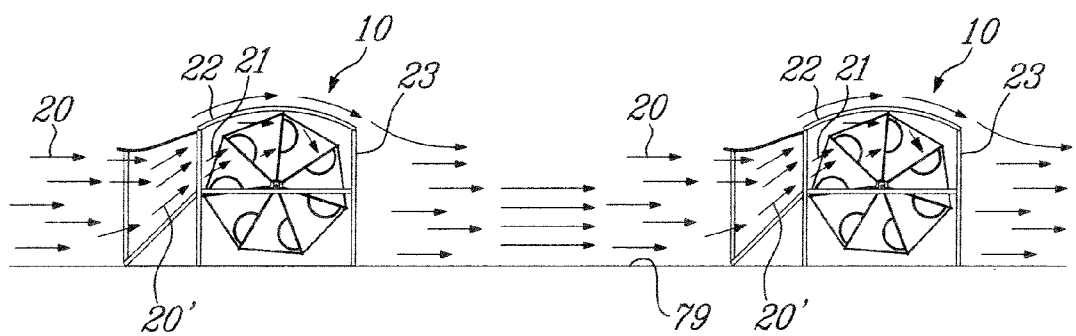
FIG. 8C is a simplified schematic view showing two series of wind powered turbines of the present invention disposed on a surface in a back-to-back spaced arrangement.

Referring now to FIG. 8A, there is shown two wind powered turbines 10 and 10' constructed in accordance with the present invention and interconnected in side-by-side relationship. To effect this interconnection, the rotor shafts 13 and 13' of respective wind powered turbines 10 and 10', need to be interconnected. This is accomplished, as shown in FIG. 8B, by a flexible coupling whereby to couple the rotor shafts to form a common rotor shaft to drive the electric motor 19 connected at an end of the series connected wind powered turbines. There can be several of these turbines 10, 10' interconnected side-by-side, as illustrated in FIG. 10.

As shown in FIG. 8B, the flexible coupling is herein comprised by a sprocket 80 and 80' secured respectively to an adjacent end of the adjacent rotor shafts 13 and 13' and interconnected together by a circular chain link belt 81 engaged about both sprockets 80 and 80' and retaining them in side-by-side relationship to permit flexibility between the interconnected rotor shafts 13 and 13' as each turbine is independent which causes the combined rotor shaft to vibrate due to the torque generated by each rotor. The flexible coupling can have many different structures such as being constituted by a rubber bushing couplings or other mechanical coupling structures.

As shown in FIG. 8C, these series of interconnected turbines can also be disposed in back-to-back spaced relationship on a surface 79 which may be the roof of a building or any other convenient surface where such an installation is desirable.

Although not shown, it is contemplated that the horizontal wind turbine can be mounted on a swivel base and may also have a wind fin or sensor to orient the turbine in the wind direction. Such an installation could be used where there is no electrical power available to supply a limited user load.

Referring now to FIG. 10, there is shown a block diagram of a typical automated system to which the wind powered turbine 10 of the present invention may be connected to permit proportional regeneration of an electrical supply. As previously described, the rotor shaft of the wind turbine operates an electric motor 19 which generates a variable electrical output, depending on the rotational speed of the rotor shaft. This variable output is fed to a regenerative drive which is controlled with a torque set point. The set point varies with the actual wind speed. High winds involve a high torque set point which generates more power on the existing electrical network infrastructure. During very high winds, the maximum regeneration is maximized to the limit of the generator so the production never stops, even during very high winds. Such a regenerative drive is provided by ABB and herein schematically illustrated by the block 80. It can be adapted to drive an optional transformer 81 and/or the electrical network infrastructure 82 of a building. Integrated with this known electrical equipment is a system controller 75 which operates the venturi gate 47 and rear gates 60 and 61 (when provided) depending on wind direction. The controller 75 is also fed signals from a wind speed sensor 83, a vibration sensor 84 and a noise sensor 85 to provide proper adjustments of the venturi gates and outlet gates to effect proper operation of the rotor to control these various parameters.

Figure 11:
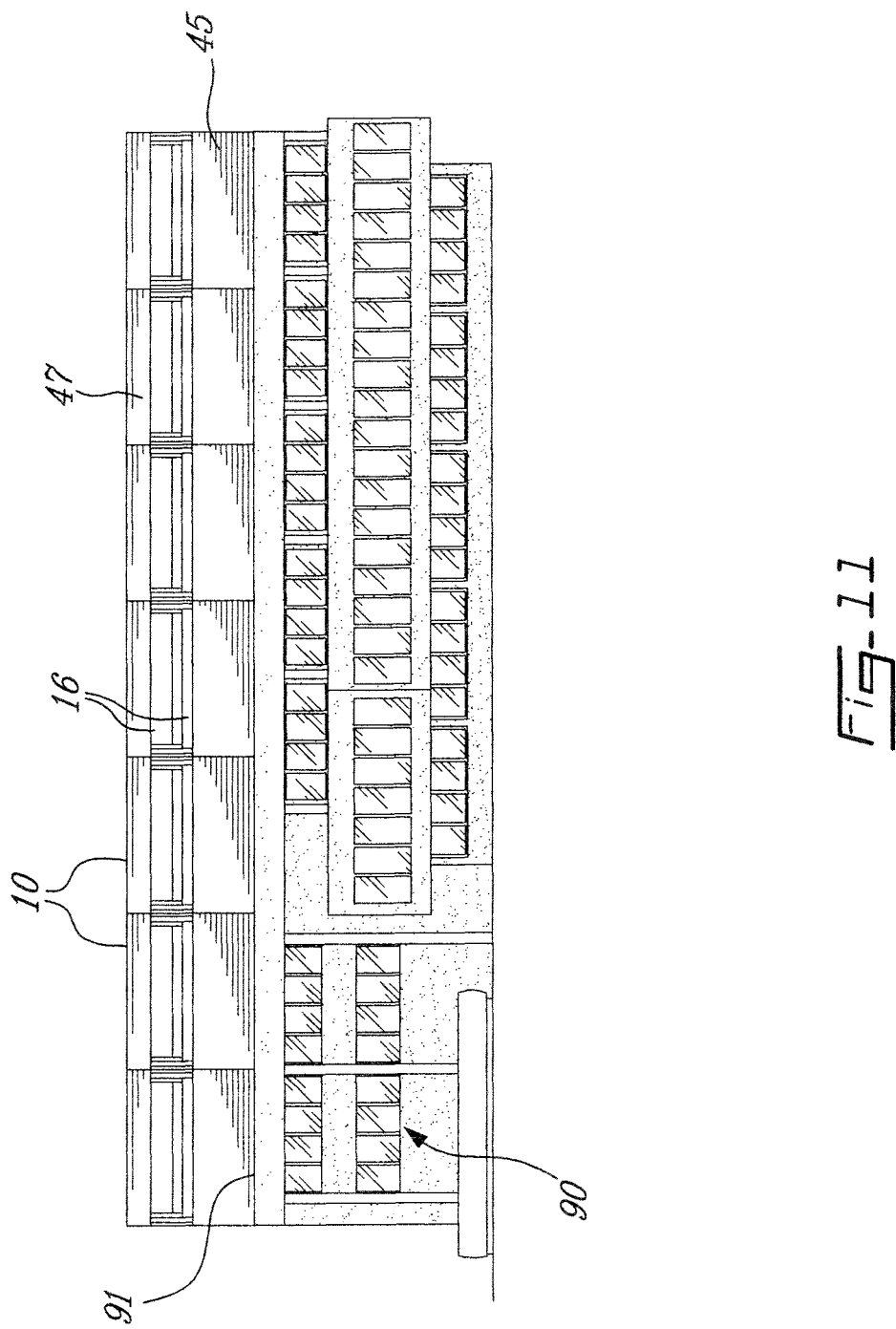
FIG. 11 is an illustration of a building having a plurality of serially connected horizontal wind powered turbines constructed in accordance with the present invention and mounted on the roof structure of the building.

FIG. 11 is a front view of a building 90 having secured on the roof 91 thereof wind turbines 10 constructed in accordance with the present invention. As hereinshown, there are seven of these wind turbines interconnected in a side-by-side relationship. They also blend well with the building and provide an aesthetic appearance to the building. They can, of course, also be painted to blend within the aesthetics of the building.

Because of their lightweight structure, many of these turbines can be supported on the rooftops of buildings. It is also easier to capture wind on top of buildings often catching the updraft created by the building wall below the turbines. The electrical infrastructure is already close to the roof.

Figure 12:
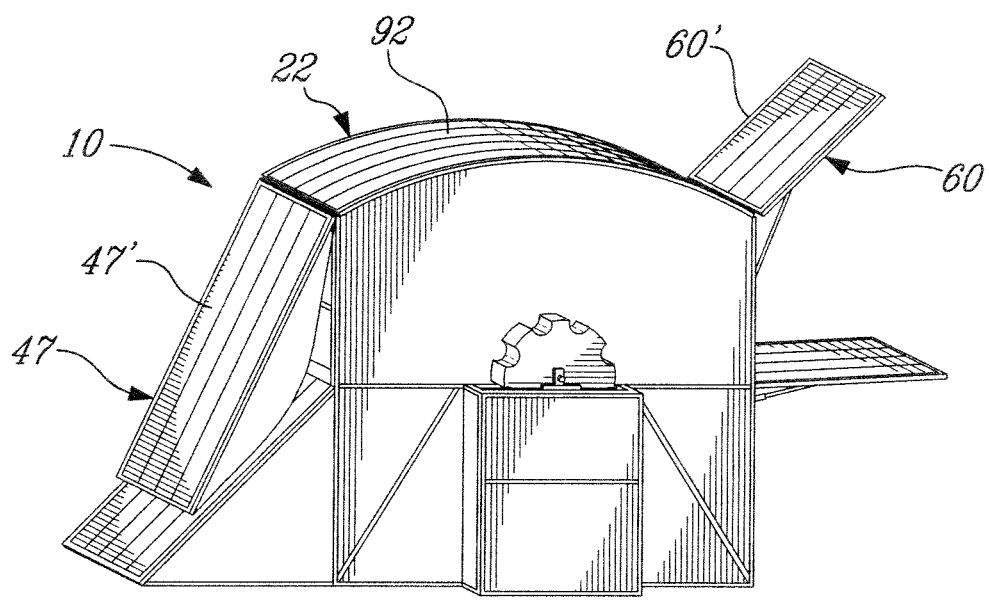
FIGS. 12 and 13 are perspective views of the wind turbine having photo electric cells secured thereto and some being orientable to different position to increase the wattage of square meters used on a roof surface.
Figure 13:
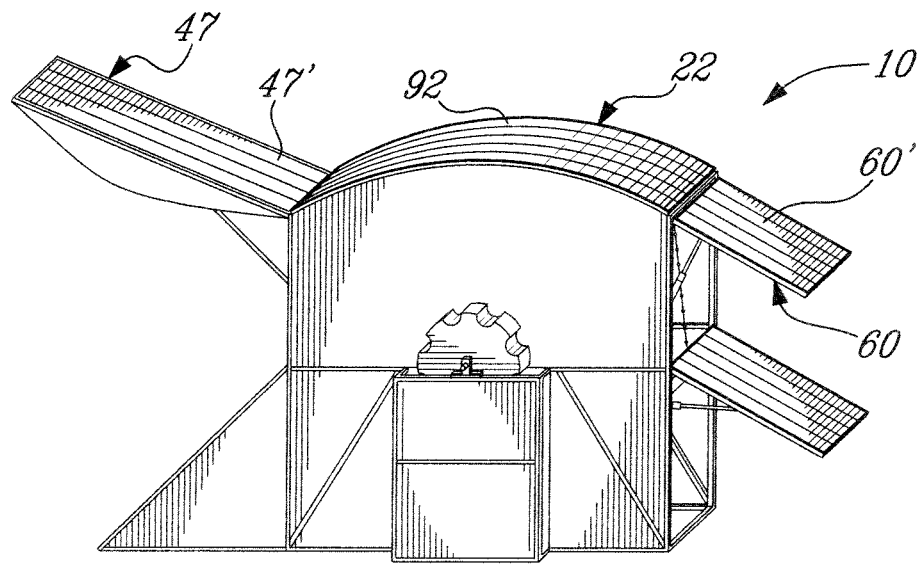

Referring to FIGS. 12 and 13 there is shown a further modification of the wind turbine 10. As hereinshown, the top wall 22 of the housing is fitted with solar panels 92 as well as the top surface 47' of the adjustable venturi gate 47 and the top surface 60' of the top outlet gate 60 whereby to increase the W/m$^2$ (watts per meter square) that can be produced with an installation on a roof top, such as shown in FIG. 11. The adjustable venturi gate 47 and top outlet gate may also be adjustable by motor control whereby to be oriented at different angles during daytime to track to sunlight when there is hardly any wind and thus producing electrical energy.

FIGS. 12 and 13 show different orientations of the venturi gate 47 and the top outlet gate where the sun is facing front wards or rear ward of the wind turbine. Thus, additional electrical energy is produced by the solar panels 92, 47' and 60' during operation of the wind turbine 10 enhancing the energy produced to about 140% on a roof top with the addition of light weight solar panels on an existing support (the wind turbine) without the use of additional roof top surface. An advantage is the result of a faster payback of the installation. Solar panels may also be installed in the space between wind turbines installed back-to-back as shown in FIG. 8C to further increase W/m2.

The solar panels utilized are flexible photovoltaic panels which are usually in sheet form and can be glued on the surfaces. They are less expensive than rigid panels requiring fixed supports which are not necessary in our application, resulting in a cost savings of about 40%. The photovoltaic sheets may be glued on the surfaces.

The following are examples of increase in energy produced with the combined power generation wind turbine.

Example 1

Increase in power for a wind turbine of 10 kW, namely 5 modules of 2 kW.
Installation of 55 FlexLight Uni-Solar PVL 68 watt laminates
Max. power of the turbine: 10 000 W
Max. power of the solar panels: 3740 W
Max. increase in power generated: 137%

Example 2

Increase in power for a wind turbine of 10 kW having a utilization factor of 20%.

If we compare the solar panels secured to the wind turbine to panels secured to supports on a roof top, the electricity production increases by 112%.

The wind powered turbine of the present invention offers several advantages:

Can be installed on flat or inclined roofs.
Its horizontal configuration.
Its modular aspect (side-by-side).
The shelter structure protects against bad weather conditions.
The doors are adjustable to increase, decrease or stop inlet wind.
Each turbine section is 10' in length (however this dimension may vary).
Lightweight structure.
Low height makes components easily accessible.
Can be installed on existing buildings.
Given size of the assembly, special installation permits may be avoided.
Can generate power from winds as low as 5 km/h which is typically 80% of winds in certain areas.
Can possibly sustain up to 200 km/h winds.
Wind deflection concentrates wind towards the wind catching vanes and improves power generation efficiency.
Structure of assembly easily accessible for maintenance with even a step-ladder.
If a wind catching vane fails, it may be easily replaced.
Assembly may be disassembled by hand.
Can be installed for residential, industrial, institutional applications.
Simple maintenance.
Low cost.
Overall size may be adjusted for different applications.
Assembly may be easily transported from one location to another.
As opposed to large wind turbines that require construction of specific access roads, the present assembly does not require such an infrastructure for installation onsite.
Easy to manufacture.
Can resist to wind gusts.
Small, medium and large power applications can be designed from the same concept and simply scaling the components appropriately.
Personnel within the building supporting the wind turbine can supervise operation of the turbine. No specially-qualified personnel is required.
Replacement parts are easily accessible and can be provided under short notice.
It may also directly produce hydrogen or heat water for future use.
Can couple photo cell panels to produce more electricity per square meter of space on a roof top.

Figure 14:
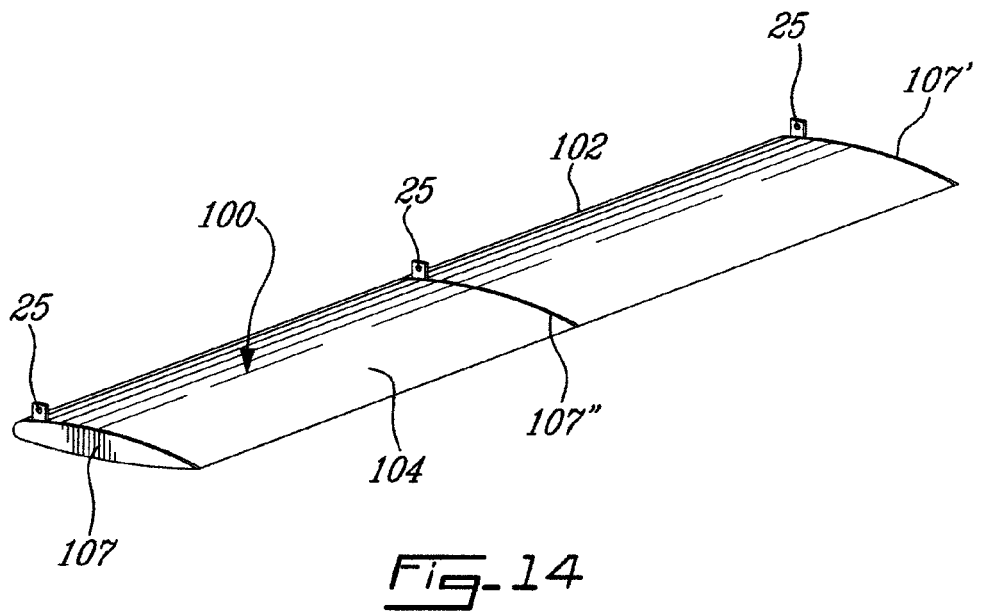
FIG. 14 is a perspective view of the elongated elliptically-shaped wind vane illustrating another embodiment of the invention.
Figure 15:
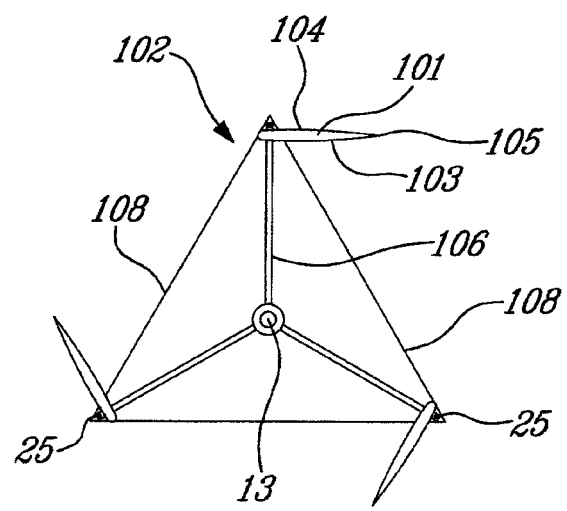
FIG. 15 is a side view of the rotor incorporating the wind vane of FIG. 14.

Referring now to FIGS. 14 to 15, there is shown another embodiment of the construction of the wind vanes. As hereinshown, the wind vane 100 is an elongated elliptically-shaped wind vane having an elliptical transverse cross-section 101 as better shown in FIG. 15. The wind vane defines a convexly curved front nose section 102 and inwardly and rearwardly tapered lower and upper walls 103 and 104, respectively, which terminate in a narrow pointed rear edge 105. These elongated elliptically-shaped wind vanes 100 are secured to support arms 106 which are constructed in the same fashion as the support arms 15. As shown in FIG. 14, the vanes 100 are provided with reinforced end flanges 107 and 107' and a central reinforced flange 107" to which is secured the adjustable wire connector 25 as previously described.

Figures 16, 17:
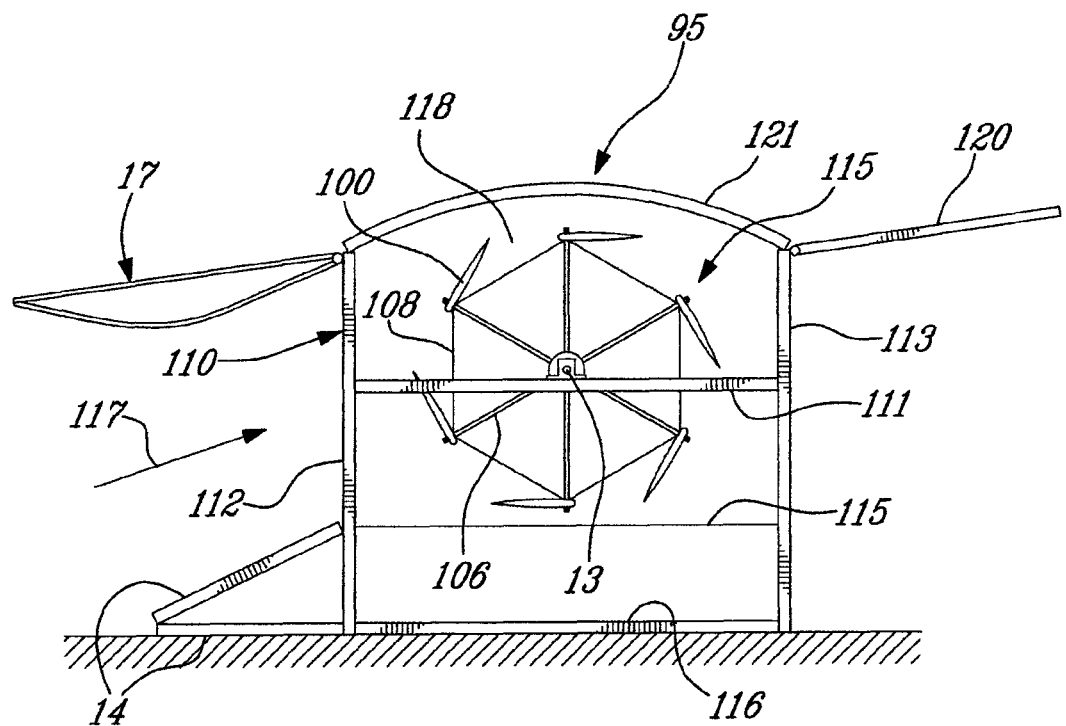
FIG. 16 is a side view showing the rotor of FIG. 15 mounted in the support frame housing when in an open condition.
FIG. 17 is a comparison chart showing the power capable of being produced by a Darreius vane and the bucket vanes.

The adjustable wire connectors 25 are also secured to the tie-wires 18 in the same fashion as previously described. The support arms 106 are further connected to a rotor shaft 13 as previously described which as shown in FIG. 16 is supported on a frame member 111 of the frame assembly 110. The frame assembly 110 is part of a housing which is similar to the housing as shown in FIG. 2 but the entire rotor assembly 115 is exposed in the space defined between the adjustable inlet opening 112 and the adjustable outlet opening 113. The adjustable inlet opening 112 is also provided with the air channeling structure 17 shown in FIG. 1A with the exception that the ramp 114 leads to a solid bottom wall 115 disposed elevated from the lower support frame 116 whereby the entire rotor assembly 115 is exposed to the incoming airflow 117 which is directed through the rotor chamber 118 to actuate the rotor assembly 115 to rotate counter-clockwise.

The housing 95 also has a convexly curved top wall 121 with the elliptically-shaped wind vanes 100 spaced inwardly therefrom as shown in FIG. 15.

As shown in FIG. 15, the housing 95 is further provided with an adjustable outlet gate 120 which is automatically operated by pistons or other means for adjusting the pressure within the chamber 118.

The elongated elliptically-shaped wind vanes are known in the art and used in vertical wind generators. These vanes are commonly referred to as Darrieus wind vanes. These vanes are more efficient than the bucket vanes as described herein and the Table as illustrated in FIG. 17 which shows a comparison between the bucket vanes and the Darrieus vanes. As can be seen, with a wind of 45 km/hr, the bucket vanes of the present invention would generate 2.054 kW per hour whereas the Darrieus vane would generate 3.961 kW per hour, which is a remarkable difference.

It is within the ambit of the present invention to cover any obvious modifications of the preferred embodiment described herein provided such modifications fall within the scope of the appended claims.

I claim:

1. A horizontal wind powered turbine comprising a frame on which is horizontally and rotatably supported a rotor on a rotor shaft, said rotor being formed by three or more radial blade members secured to said rotor shaft by a shaft connecting assembly, said radial blade members being equidistantly spaced from one another, each said radial blade member having support arms and a wind vane secured to an outer end portion of said support arms, said wind vane being shaped to capture an airflow directed thereagainst for displacement thereof to create a rotational force about said rotor shaft to rotate said rotor shaft about a longitudinal central axis thereof, said radial blade members being rigidly interconnected to one another at an outer end portion thereof by tension adjustable wires, the outer end portions of said support arms including non-resilient wire connectors, the wire connectors tensioning the wires at a desired tension, the support arms including a spring permitting axial displacement thereof, the springs being spaced from the wire connectors, and an air inlet channeling structure to accelerate and direct said airflow in an actuating airflow path to impinge upon said wind vanes positioned in said actuating airflow path to displace said wind vane by wind drag.

2. A horizontal wind powered turbine as claimed in claim 1 wherein said tension adjustable wires is comprised by tie-wires of equal lengths secured to the wire connectors.

3. A horizontal wind powered turbine as claimed in claim 2 wherein the wire connectors are secured to a free outer end of each said support arms, said wind vane being secured between two support arms.

4. A horizontal wind powered turbine as claimed in claim 3 wherein each of the wire connectors is a wire retention member displaceable along a longitudinal axis of said support arms.

5. A horizontal wind powered turbine as claimed in claim 4 wherein said wire retention member is a wire attachment sleeve about which loop ends of opposed tie-wires are retained captive, said wire attachment sleeve being displaced along a threaded bolt secured in a top end of said support arms, lock nuts threadably secured to said threaded bolt with said sleeve held captive therebetween displacing the wire retention member along the longitudinal axis.

6. A horizontal wind powered turbine as claimed in claim 3 wherein the wire connectors include each an adjustable bolt connector having a threaded shaft portion threadably connected in said free outer end, a wire attaching sleeve supported by said threaded shaft portion for captively receiving an end attaching loop of opposed tie-wires, said bolt connector having an engageable outer head to impart rotation of said bolt connector to cause displacement of said wire attaching sleeve to increase or decrease tension in said opposed tie-wires to balance and strengthen said radial blade members about said rotor shaft.

7. A wind powered turbine as claimed in claim 3 wherein said shaft connecting assembly is comprised by two shaft connecting assemblies, each assembly having three or more rigid posts immovably secured to said shaft and spaced apart to displaceably interconnect with an inner connecting end portion of said two support arms of said three or more radial blade members.

8. A wind powered turbine as claimed in claim 7 wherein said rigid posts are hollow tubular posts, said support arms being straight rods having a cross-section for close sliding fit engagement in respective ones of said hollow tubular posts, and a lock screw to temporarily immovably secure said straight rods in said hollow tubular posts at a predetermined position.

9. A wind powered turbine as claimed in claim 8 wherein the springs are held captive in said hollow tubular posts and permits axial displacement of said straight rods due to thermal expansion and contraction, said tie-wires maintaining said solid rods captive in said hollow tubular posts.

10. A wind powered turbine as claimed in claim 7 wherein said two shaft connecting assemblies further comprises flat disc connectors having a hub secured to said shaft, said three or more rigid posts being secured to a side wall of said flat disc.

11. A wind powered turbine as claimed in claim 10 wherein said shaft connecting assemblies are made of steel, said two support arms and said wind vane being constructed of lightweight aluminum material.

12. A wind powered turbine as claimed in claim 1 wherein said wind vanes are shaped as buckets having an elongated inwardly curved inner wall and opposed transverse end walls, said opposed transverse end walls having a straight forward edge, said support arms being straight support arms, said outer end portion of said support arms being secured to a respective one of said straight forward edge of said transverse end walls.

13. A wind powered turbine as claimed in claim 12 wherein said inwardly curved inner wall has a cross-sectional shape which is one of semi-elliptical or semi-circular.

14. A wind powered turbine as claimed in claim 12 wherein said transverse end walls are wind captivating end walls, and wherein there is further provided one or more spaced intermediate wind captivating walls between said end walls.

15. A wind powered turbine as claimed in claim 14 wherein at least a further one of said support arms is secured to said straight forward edge of one or more of said intermediate wind captivating walls.

16. A wind powered turbine as claimed in claim 1 wherein said air inlet channeling structure comprises an inclined guide ramp wall below an air inlet end of said frame and an adjustable venturi gate hingedly secured to said frame above said air inlet end, said adjustable venturi gate having an inner wall surface defining a curvature to impart a venturi effect to said airflow upwind of said air inlet end when positioned a predetermined distance spaced from said ramp wall to accelerate said airflow.

17. A wind powered turbine as claimed in claim 16 wherein said adjustable venturi gate is displaceable from an open position to a closed position, when in said closed position said adjustable gate substantially obstructs said air inlet end, said adjustable gate being biased to said open and a wire and pulley assembly to displace and retain said gate at a desired position against said bias.

18. A wind powered turbine as claimed in claim 17 wherein the adjustable gate is biased by one or more shocks.

19. A wind powered turbine as claimed in claim 16 wherein said ramp wall is provided with a plurality of vertical guide ribs disposed spaced-apart and axially oriented towards said air inlet end to redirect air from said airflow path impinging thereupon angularly.

20. A wind powered turbine as claimed in claim 17 wherein said wire and pulley assembly is comprised by a pulley and cable motor driven mechanism controlled by a controller unit.

21. A wind powered turbine as claimed in claim 17 wherein said wire and pulley assembly is comprised by a mechanically adjustable mechanism.

22. A wind powered turbine as claimed in claim 16 wherein said frame is provided with an outwardly curved top wall spaced above said radial blade members and extending from said air inlet end to an outlet end.

23. A wind powered turbine as claimed in claim 16 wherein said wind powered turbine is a bi-directional turbine, and wherein a rear end of said frame is provided with top and bottom outlet gates hingedly secured to a top half and lower half portion of said frame above said half potions, said outlet gates being biased in an open position, and a wire and pulley mechanism to position said outlet gates to guide back winds into said lower half portion of said frame to create a reverse actuating airflow path to impinge upon said radial blade members in a lower portion of said frame, said inclined guide ramp wall having a hinged ramp section hingeable inward to create an opening below said air inlet end for the passage and guidance of said reverse actuating airflow path, said hinged ramp section providing a guide wall surface for said reverse actuating airflow path.

24. A wind powered turbine as claimed in claim 1 wherein two or more of said wind powered turbines are disposed in side-by-side relationship with their rotor shaft interconnected by a flexible coupling to form a common rotor shaft driven by said two or more wind power turbines.

25. A wind powered turbine as claimed in claim 24 wherein said flexible coupling is comprised of a sprocket secured to adjacent ends of said rotor shaft, said sprockets being interconnected together by a chain link belt engaged about said sprockets to permit flexibility between said interconnected rotor shafts.

26. A wind powered turbine as claimed in claim 24 wherein said wind powered turbines are further disposed in spaced back-to-back spaced relationship.

27. A wind powered turbine as claimed in claim 17 wherein said rotor shaft is drivingly connected to an electric motor to generate a variable electric voltage, a regenerative drive with a torque set point supplies a regulated output voltage to an electrical network infrastructure of a building to be supplied by said wind powered turbine.

28. A wind powered turbine as claimed in claim 27 wherein there is further comprised a system controller for controlling said wind powered turbine, said controller controlling said wire and pulley assembly, and sensors secured to said controller for monitoring wind speed, noise and vibration.

29. A wind powered turbine as claimed in claim 22 wherein said outwardly curved top wall of said frame and a top surface of said adjustable venturi gate are provided with photocells to increase the W/m2 (watts per meter square) generated on a roof top to which said wind powered turbines are installed.

30. A wind powered turbine as claimed in claim 23 wherein said outwardly curved top wall of said framer and a top surface adjustable venturi gate and said top outlet gate are provided with photocells to increase the W/m2 (watts per meter square) generated on a roof top to which said wind powered turbines are installed.

31. A wind powered turbine as claimed in claim 29 wherein said photocells are photovoltaic photocells formed as a flexible sheet.

32. A wind powered turbine as claimed in claim 30 wherein said photocells are photovoltaic photocells formed as a flexible sheet.

33. A wind powered turbine as claimed in claim 1 wherein said wind vanes are elongated elliptically-shaped wind vanes having an elliptical transverse cross-section and define a convexly curved front nose section and inwardly and rearwardly tapered lower and upper walls terminating in a narrow pointed rear edge.

34. A horizontal wind powered turbine as claimed in claim 33 wherein said tension adjustable wires is comprised by tie-wires of equal lengths secured to the wire connectors.

35. A horizontal wind powered turbine as claimed in claim 34 wherein said wire connector is secured to a free outer end of each said support arms, said wind vane being secured between two support arms.

36. A horizontal wind powered turbine as claimed in claim 35 wherein said wire connector is a wire retention member displaceable along a longitudinal axis of said support arms.

37. A horizontal wind powered turbine as claimed in claim 36 wherein said wire retention member is a wire attachment sleeve about which loop ends of opposed tie-wires are retained captive, said wire attachment sleeve being displaced along a threaded bolt secured in a top end of said support arms, lock nuts threadably secured to said threaded bolt with said sleeve held captive therebetween displaying the wire retention member along the longitudinal axis.

38. A horizontal wind powered turbine as claimed in claim 35 wherein said wire connector is an adjustable bolt connector having a threaded shaft portion threadably connected in said free outer end, a wire attaching sleeve supported by said threaded shaft portion for captively receiving an end attaching loop of opposed tie-wires, said bolt connector having an engageable outer head to impart rotation of said bolt connector to cause displacement of said wire attaching sleeve to increase or decrease tension in said opposed tie-wires to balance and strengthen said radial blade members about said rotor shaft.

39. A wind powered turbine as claimed in claim 35 wherein said shaft connecting assembly is comprised by two shaft connecting assemblies, each assembly having three or more rigid posts immovably secured to said shaft and spaced apart to displaceably interconnect with an inner connecting end portion of said two support arms of said three or more radial blade members.

40. A wind powered turbine as claimed in claim 39 wherein said rigid posts are hollow tubular posts, said support arms being straight rods having a cross-section for close sliding fit engagement in respective ones of said hollow tubular posts, and a lock screw to temporarily immovably secure said straight rods in said hollow tubular posts at a predetermined position.

41. A wind powered turbine as claimed in claim 40 wherein the springs are held captive in said hollow tubular posts to permit axial displacement of said straight rods due to thermal expansion and contraction, said tie-wires maintaining said solid rods captive in said hollow tubular posts.

42. A wind powered turbine as claimed in claim 39 wherein said two shaft connecting assemblies further comprises flat disc connectors having a hub secured to said shaft, said three or more rigid posts being secured to a side wall of said flat disc.

43. A wind powered turbine as claimed in claim 42 wherein said shaft connecting assemblies are made of steel, said two support arms and said wind vane being constructed of lightweight aluminum material.

44. A wind powered turbine as claimed in claim 33 wherein said air inlet channeling structure comprises an inclined guide ramp wall below an air inlet end of said frame and an adjustable venturi gate hingedly secured to said frame above said air inlet end, said adjustable venturi gate having an inner wall surface defining a curvature to impart a venturi effect to said airflow upwind of said air inlet end when positioned a predetermined distance spaced from said ramp wall to accelerate said airflow.

45. A wind powered turbine as claimed in claim 44 wherein said adjustable venturi gate is displaceable from an open position to a closed position, when in said closed position said adjustable gate substantially obstructs said air inlet end, said adjustable gate being biased to said open position and a wire and pulley assembly to displace and retain said gate at a desired position against said bias.

46. A wind powered turbine as claimed in claim 45 wherein said adjustable gate is biased by one or more shocks.

47. A wind powered turbine as claimed in claim 44 wherein said ramp wall is provided with a plurality of vertical guide ribs disposed spaced-apart and axially oriented towards said air inlet end to redirect air from said airflow path impinging thereupon angularly.

48. A wind powered turbine as claimed in claim 44 wherein said frame is provided with an outwardly curved top wall spaced above said radial blade members and extending from said air inlet end to an outlet end.

49. A wind powered turbine as claimed in claim 33 wherein there are a plurality of said elliptically-shaped wind vanes secured spaced-apart about said rotor shaft.

* * * * *